Figure 1:
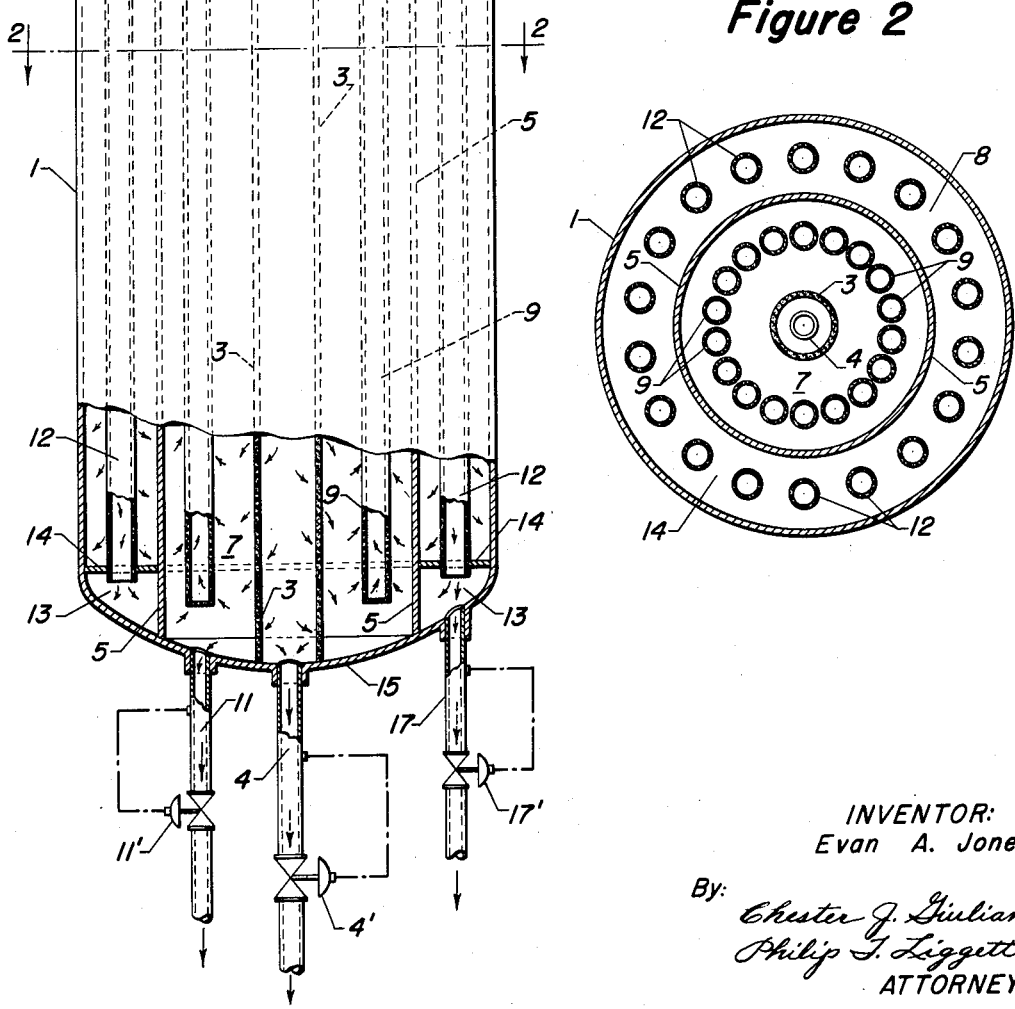

Feb. 14, 1956  E. A. JONES  2,734,592
SEPARATION OF GASES
Filed Feb. 26, 1953

INVENTOR:
Evan A. Jones

By:
Chester J. Giuliani
Philip G. Liggett
ATTORNEYS

United States Patent Office 2,734,592
Patented Feb. 14, 1956

2,734,592

SEPARATION OF GASES

Evan A. Jones, Chicago, Ill., assignor to Universal Oil Products Company, Des Plaines, Ill., a corporation of Delaware Application February 26, 1953, Serial No. 339,058

5 Claims. (Cl. 183—2)

This invention relates to means for effecting the separation of gases and more particularly to effecting the separation and concentration of gases having different molecular weights or densities from a mixture thereof, by means of a physical diffusion.

It has been generally known that when mixed gases are passed into porous containers, or are permitted to pass through a permeable wall means, the lighter gases tend to diffuse through the walls more rapidly than the heavier gases, primarily due to the more intense molecular action of the molecules. Since the rate of diffusion varies with differences in density, there may be provided a method for effecting the separation and concentration of varying gaseous fractions from a mixture thereof.

It is a principal object of this invention to provide means for passing a mixed gaseous stream through multiple passes of permeable wall zones or passageways and to effect by diffusion the separation and concentration of a plurality of gaseous fractions.

It is also an object of the present invention to provide an improved operation whereby one or more of the separated gaseous fractions may be increased in purity, as compared with a product normally obtained by a single pass diffusion operation.

It is a still further object of the present invention to provide an improved compact multiple pass apparatus suitable for effecting the separation of a plurality of gaseous fractions from a mixture of gases.

Briefly, the improved operation of the present invention provides a multiple stage diffusion separation which comprises, introducing a gaseous mixture into a permeable wall first separation zone, discharging a heavier non-permeated gaseous fraction from the downstream end of the zone, collecting the lighter permeated gas from the first permeable zone and passing it through a succeeding permeable wall zone, discharging a non-permeated gaseous fraction from the downstream end of the latter zone while collecting and passing the permeated lighter gaseous fraction through at least one successive permeable wall separation zone, discharging non-permeated gas from each successive zone of the series while passing the permeated lighter fraction in each case to the next successive zone in the series and subsequently recovering a light fraction of the gaseous mixture.

The diffusion of the gaseous streams may be made through various types of permeable materials, such as carbon, unglazed porcelain, fritted glass, porous types of steel, and the like. Normally, diffusion of gases proceeds rather slowly; however, the rate of diffusion may be increased in various ways, as for example by providing increased surface area and relatively thin permeable walls for each of the separation zones. Increasing temperature and increasing the pressure drop through the various permeable walls, or from one separation zone to another, will also increase the rate of diffusion. Thus, where a series of successive separation zones are to be utilized, it is preferable to introduce the mixed gaseous stream at a substantially high pressure so that a considerable pressure drop may be taken at each stage of separation. Also, of course, the diffusion medium may be varied between the different stages, such that in each case the medium has a pore diameter less than the mean molecular free path of the gases in the mixture.

Various types of permeable wall zones may be provided, as for example by permeable diaphragms of partitions between adjacent sections in a chamber. Cylindrical or tubular shaped permeable walls within suitable container means may also be provided for the diffusion operation.

A desirable apparatus embodiment for effecting multiple stage separation and concentration of gaseous fractions is provided by the present invention and comprises in combination, a confined pressure retaining gas separating chamber, a centrally positioned permeable tube or conduit extending longitudinally through the chamber with a gas stream inlet means at one end thereof and a non-permeated gas stream outlet means at the opposing end thereof, at least one intermediate solid partitioning means within the separating chamber circumscribing the centrally positioned gas permeable tube and spaced therefrom in a manner forming an inner gas collecting section and at least one circumscribing gas collecting section, a plurality of spaced permeable wall tubular members positioned within the inner gas collecting section and connecting with a gas stream collecting and distributing header at one end thereof, additional spaced permeable wall tubular members positioned within the circumscribing gas collecting section, end portions of each of the tubular members of the additional plurality thereof connecting with the aforesaid header means and thereby communicating with the first mentioned plurality of tubular members, means for discharging non-permeated gas from the opposing end portions of the additional plurality of tubular members, and gas outlet means from each of the aforesaid inner and outer circumscribing gas collecting sections whereby successively lower molecular gaseous mediums may be discharged from the gas separating chamber after each successive pass through the permeable wall tubular members.

Preferably, the apparatus arrangement is within a substantially cylindrical chamber and the plurality of tubular members within the gas collecting sections are positioned within a circular arrangement such that a substantially compact elongated apparatus may be provided. The various gas collecting or distributing headers may, in a desirable embodiment, connect with the plurality of tubular members within the ends of the chamber such that gas inlet or outlet conduits to the various stages of separation may be made directly through the ends or heads of the separating chamber.

A desirable improved method of operation provided by the present invention permits the withdrawal of the permeated gaseous fraction from the separating chamber and the return of one or more reflux streams thereto in a manner providing increased purity for such fractions. In other words, where it is desired to increase the purity of a particular diffused gaseous fraction, such fraction is compressed and returned to the inlet end of the permeable zone from which it was diffused and withdrawn, and in this manner increase the concentration of that particular fraction to in turn increase the purity of the resulting product permeating from the zone and discharged therefrom.

The improved operation and apparatus arrangement of the present invention may be better set forth by reference to the accompanying drawing and the following description thereof.

Figure 1 of the drawing shows in elevational view and partially in section, a specific embodiment of a multiple pass gas diffusing apparatus suitable for separating and discharging various molecular weight gaseous fractions from a charge mixture.

Figure 2:
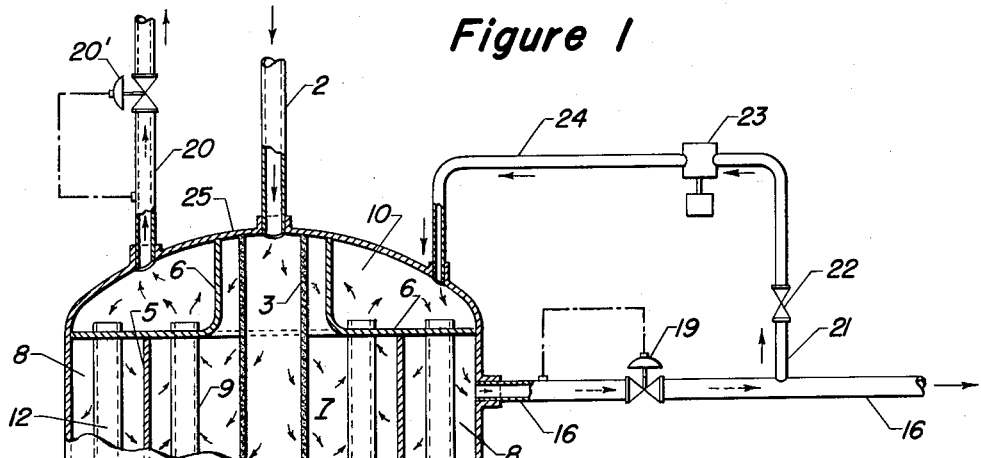

Figure 2 of the drawing shows a partial sectional plan view through the apparatus, as indicated by the line 2—2 in Figure 1 of the drawing.

Referring now to the diffusion operation in connection with this embodiment, a mixed gaseous stream is charged to an enclosed separating chamber 1 by way of an inlet port 2 which in turn communicates directly with an interior permeable wall tubular member 3. This latter member extends substantially axially through the entire length of the separating chamber 1 and communicates with a gas outlet port 4 which is suitable for discharging the heavier non-permeated gases passing through this first stage. A tubular member 3 has a wall formed of carbon or other permeable material suitable for effecting the diffusion of certain of the lower molecular weight gaseous fractions into an inner portion of the chamber. An inner cylindrical partitioning member 5, together with an upper end partitioning member 6 divides the separating chamber 1 into an inner gas collecting section 7 and an outer gas collecting section 8. Each of the gas collecting sections within the cylindrical chamber is of an annular shape. Section 7 is formed around the inner permeable wall tube or conduit 3 and section 8 is formed between the partitioning wall 5 and the outer wall of chamber 1.

Within the inner collecting section 7 are a plurality of permeable wall tubular members 9 which connect with and pass through the upper partitioning member 6 into a gas collecting zone 10, which is formed between the upper head or top portion 25 of chamber 1 and the partition 6. Thus, in a second stage of gas separation the mixture passing through the wall of the axial conduit member 3 and into the inner zone 7 may have still lighter fractions thereof permeate the surface of the tubular members 9 and in turn pass from the latter into the collecting and distributing section 10 at the upper head of the chamber 1. The fraction or fractions of the gaseous mixture which enter zone 7 and do not permeate or diffuse through the walls of the tubular members 9 under any given state of operating conditions, will be discharged from the chamber by way of a suitable gas outlet line 11 and control valve 11'. In still another stage of diffusion and gas separation, the fraction which enters the collecting and distributing section 10 may be withdrawn therefrom by an outlet line 20 and control valve 20', or alternatively, passed downwardly through another plurality of smaller tubular members 12 which are positioned within the outer gas collecting section 8. The upper ends of the tubular members 12 open into and communicate with the section 10 so that the gaseous fraction passes substantially uniformly downwardly through each of the plurality of permeable wall tubular members 12 to undergo further diffusion and gas separation. The non-diffused or non-permeated gas is discharged from the lower ends of each of the plurality of tubes 12 into another collecting section 13 at the lower end portion of the separating chamber 1. The section 13 is formed in the present embodiment by the intermediate cylindrical partition 5 and a horizontal non-permeable partitioning member 14, as well as by a portion of the lower head 15. The light gaseous fraction which diffuses through the permeable walls of the tubular members 12 passes into the outer gas collecting section 8 and is discharged from the latter by way of outlet conduit 16 and control valve 19. The heavier fraction received in collecting section 13 is discharged from the chamber 1 by way of an outlet port 17 having control valve 17'.

It should be noted that the present embodiment is one which provides for the separation by diffusion of four, or if desired, five gaseous fractions from a mixed stream. However, additional partitioning members, such as 5, and additional permeable wall tubular members arranged in concentric rows in additional gas collecting sections similar to 7 and 8 may be provided, whereby a greater number of stages of gas diffusion may be carried out and additional fractions separated from a mixed stream.

As mentioned briefly hereinbefore, one or more of the separated gaseous streams may be increased in purity by effecting the refluxing of at least a portion of the discharged fraction. For example, there is shown in the accompanying drawing the return of a reflux stream by means of an inlet line 24 which is connective with the collecting and distributing header 10. The fraction discharged from the outer annular collecting section 8, through outlet conduit 16, may have a portion thereof passed by way of line 21 and valve 22 to a suitable compressor 23 and from the latter by way of line 24 back to the distributing header 10. The latter in turn distributes the refluxed gaseous stream downwardly through the permeable wall tubular members 12 for further diffusion. In this manner, the concentration of the particular gaseous fraction being diffused through members 12 is increased and there is a resulting increase in purity in the recovered fraction. In a similar manner, portions of other gaseous fractions may be compressed and reintroduced into the inlet ends of the permeable wall sections or members from which they were discharged to provide for an increase in purity of such fraction by the diffused operation. For example, a portion of a fraction discharged from outlet 11 may be refluxed into the inlet port 2, or a portion of the fraction discharged from header 10 may be compressed and refluxed to the inner collecting zone 7 to increase the purity of a fraction diffused through the tubular members 9 and collected in the header 10.

The present method of operation and apparatus may well be used in connection with various types of mixed gases as for example, in the separation of normally gaseous hydrocarbon fractions. A mixture of hydrocarbon gases, including $C_4$, $C_3$, $C_2$, and $C_1$, and hydrogen may be introduced to the separating chamber 1 and to the first stage of diffusion by way of inlet 2. The mixture is also preferably introduced at a pressure and temperature which is correlated with the permeable wall center conduit 3 so that substantially all of the $C_3$ and lighter gases are diffused through the wall of member 3 and into the inner collecting zone 7, while the $C_4$ fraction may be discharged by way of the outlet 4. The permeated gas stream collected within zone 7 undergoes a further pressure drop in passing into the interior of the permeable wall tubular members 9 and into the collecting header 10. The pressure drop encountered in effecting this stage of diffusion and the surface area provided by the tubular member 9 are correlated such that substantially all of the $C_2$ and lighter gases pass into the header 10 while a non-permeated gaseous fraction, primarily $C_3$, is discharged from zone 7 by way of outlet 11. The gaseous fraction in header 10 passes through the plurality of permeable wall tubular members 12 and undergoes still another diffusion with primarily all of the $C_1$ and hydrogen passing to the outer annular collecting zone 8 while an unpermeated gaseous fraction consisting primarily of $C_2$ gases passes into the lower collecting header 13 to be discharged by way of outlet 17. This, of course, is merely one example of the use of the present method and arrangement for effecting a multiple stage diffusion operation and other mixed gaseous streams may well be separated into fractions of varying densities or molecular weights.

I claim as my invention:

1. A gas separating apparatus comprising a chamber, a permeable wall tubular member extending centrally through the chamber, gas inlet and outlet means at opposite ends of said member, a plurality of smaller permeable wall tubular members within the chamber around the first-mentioned tubular member, a gas collecting header at an end portion of the chamber and communicating with said smaller members but closed from communication with the first-mentioned tubular member, means for removing permeated gas from said header, and separate gas withdrawal means from the space surrounding said first-mentioned tubular member for removing from the chamber the gases that have not permeated said smaller tubular members.

2. A gas separating apparatus comprising a chamber, a permeable wall tubular member extending longitudinally through the chamber, gas inlet and outlet means at opposite ends of said member, non-permeable partitioning means between said member and the outer wall of the chamber and circumscribing the tubular member to form annular compartments in the chamber, means forming a header compartment at an end portion of the chamber, a plurality of permeable wall tubular members in each of said annular compartments and extending into said header compartment, and gas outlet means from each of said annular compartments.

3. An apparatus for separating and concentrating gases, comprising in combination, a confined gas separating chamber, centrally positioned permeable wall tube means extending longitudinally through said chamber and having a gas stream inlet means at one end thereof and a non-permeated gas stream outlet means at the opposing end thereof, at least one intermediate solid partitioning means within said chamber circumscribing said centrally positioned tube means and spaced therefrom in a manner forming separate annular-shaped gas collecting sections, a plurality of permeable wall tubular members positioned within each of said annular-shaped gas collecting sections, gas collecting and distributing header means connecting the tubular means in each of the separate sections with the tubular means in a next adjacent section and thereby providing gas flow from one plurality of tubular means to another, additional gas collecting header means connecting with each of said plurality of tubular means at the ends of the latter opposing the ends communicative with adjacent tubular means whereby a non-permeated gas stream may be discharged from each of the plurality of tubular means, gas outlet means from each of the gas collecting header means and from each of the separate annular-shaped gas collecting sections whereby successively lower molecular weight gaseous fractions may be discharged from said confined gas separating chamber after each successive pass through said permeable wall tubular means.

4. An apparatus for separating and concentrating gases, comprising in combination, a confined gas separating chamber, a centrally positioned permeable tube extending longitudinally through said chamber and having a gas stream inlet means at one end thereof and a non-permeated gas stream outlet at the opposing end thereof, an intermediate solid partitioning means within said chamber circumscribing said centrally positioned permeable tube and spaced therefrom in a manner forming an inner gas collecting section and an outer gas collecting section, a plurality of permeable tubular members positioned in said inner gas collecting section, connecting with a gas stream distributing header means at one end thereof, an additional plurality of permeable tubular members positioned within said outer gas collecting section, with each of said tubular members of said additional plurality having one end thereof connecting with said distributing header means and thereby communicative with first said plurality of tubular members, the opposing ends of said additional plurality of tubular members connecting with a second gas collecting and discharging header means, and gas outlet means from the latter header means and from each of said inner and outer gas collecting sections whereby successively lower molecular weight gaseous fractions may be discharged from said confined gas separating chamber after each successive pass through through said permeable wall tubular members.

5. The apparatus of claim 4 further characterized in that first said plurality of permeable wall tubular members comprises tubes arranged concentrically around said centrally positioned permeable wall tube within said inner gas collecting section, and said additional plurality of permeable wall tubular members comprises tubes arranged in a spaced circular arrangement within said outer gas collecting section.

References Cited in the file of this patent

UNITED STATES PATENTS

| | | |
|---|---|---|
| 2,433,741 | Crawford | Dec. 30, 1947 |
| 2,494,554 | Harlow | Jan. 17, 1950 |
| 2,540,152 | Weller | Feb. 6, 1951 |
| 2,609,059 | Benedict | Sept. 2, 1952 |